(12) United States Patent
Chen

(10) Patent No.: US 12,556,506 B2
(45) Date of Patent: Feb. 17, 2026

(54) METHOD, SYSTEM, PAYMENT DEVICE AND STORAGE MEDIUM FOR BLOCKCHAIN MAILBOX REGISTRATION

(71) Applicant: Jun Chen, Changsha (CN)

(72) Inventor: Jun Chen, Changsha (CN)

( * ) Notice: Subject to any disclaimer, the term of this patent is extended or adjusted under 35 U.S.C. 154(b) by 183 days.

(21) Appl. No.: 18/577,934

(22) PCT Filed: May 31, 2023

(86) PCT No.: PCT/CN2023/097624
§ 371 (c)(1),
(2) Date: Jan. 9, 2024

(87) PCT Pub. No.: WO2024/239368
PCT Pub. Date: Nov. 28, 2024

(65) Prior Publication Data
US 2025/0286852 A1    Sep. 11, 2025

(30) Foreign Application Priority Data

May 25, 2023  (CN) .......................... 202310600678.2

(51) Int. Cl.
*H04L 51/42*    (2022.01)
*G06Q 20/32*    (2012.01)
*H04L 9/00*    (2022.01)

(52) U.S. Cl.
CPC ......... *H04L 51/42* (2022.05); *G06Q 20/3274* (2013.01); *H04L 9/50* (2022.05)

(58) Field of Classification Search
CPC ....... H04L 51/42; H04L 9/50; H04L 2209/56; H04L 9/3239; H04L 9/40; H04L 63/083; H04L 63/0876; H04L 2463/102; G06Q 20/3274; G06Q 20/065; G06Q 20/3276; G06Q 20/401; G06Q 20/4014; G06Q 40/04; Y02D 10/00
See application file for complete search history.

(56) References Cited

U.S. PATENT DOCUMENTS

| | | | |
|---|---|---|---|
| 2017/0011460 A1* | 1/2017 | Molinari | H04L 9/3247 |
| 2018/0097779 A1* | 4/2018 | Karame | H04L 9/3236 |
| 2020/0143368 A1* | 5/2020 | Zhang | G06Q 20/065 |
| 2022/0376925 A1* | 11/2022 | Kaizer | H04L 61/4552 |
| 2025/0097012 A1* | 3/2025 | Sheth | H04L 9/0643 |

* cited by examiner

*Primary Examiner* — Johnny B Aguiar

(57) ABSTRACT

The present application discloses determining a mailbox name based on a first blockchain address, and determining the registration permission status of the mailbox name based on a transaction record and a verification balance sent from the first blockchain address to the server blockchain address for verification within the verification time limit. If the registration permission status of the mailbox name is permitted, the first blockchain mailbox is registered. Through the blockchain mailbox of the present invention, both parties in blockchain transaction can communicate and exchange directly through mailbox through the blockchain address at the time of the transaction.

14 Claims, 4 Drawing Sheets

METHOD, SYSTEM, PAYMENT DEVICE AND STORAGE MEDIUM FOR BLOCKCHAIN MAILBOX REGISTRATION

FIELD OF THE INVENTION

The present invention relates to the field of internet electronic mailbox technology, in particular to a method and system for registering blockchain mailbox.

BACKGROUND OF THE INVENTION

With the increasing penetration of existing blockchain systems in the payment field, the demand for various types of information communication has skyrocketed, and the need for information communication for a single blockchain address is urgent. Mailbox, due to its flexibility and convenience, is an effective means of information communication technology.

However, in the process of implementing the present invention, existing technologies do not verify whether the blockchain address already exists in the blockchain network when registering mailbox addresses using blockchain addresses, leading to the industry generally believing that using blockchain addresses with long and irregular names as mailbox names is meaningless.

SUMMARY OF THE INVENTION

The inventors have found that when using blockchain payments, such as legal digital currency payments, it is extremely inconvenient to directly contact the payee. According to the characteristics of blockchain payments, mailbox is more suitable for communication. There is an urgent need for a blockchain mailbox registration method to identify the identities of both the sender and receiver of mailboxes, achieve parallel and interconnected transaction information flow and payment value data flow, and build a new type of mailbox facility.

In order to overcome the shortcomings of existing technology that cannot recognize the identities of mailbox recipients and senders, and blockchain transaction parties cannot directly contact each other, and cannot map blockchain addresses one by one to mailbox names and verify the balance to the server blockchain address to complete blockchain address verification for obtaining registered blockchain mailbox, the present invention provides a method, device, payment device, and storage medium for blockchain mailbox registration, to solve the problems in the background technology mentioned above.

To achieve the above objectives, the present invention is implemented through the following technical solutions:

In a first aspect, a method for blockchain mailbox registration for a registration device, includes the following steps: sending a mailbox name verification request comprising a mailbox name determined based on a first blockchain address, the mailbox name being one-to-one mapping with the first blockchain address; receiving a mailbox name verification response comprising a server blockchain address for verification and a verification balance; determining the mailbox name registration permission status based on a transaction record of the first blockchain address sent to the server blockchain address for verification and the verification balance within the verification time limit; and sending a mailbox registration request based on the mailbox name registration permission status, wherein the mailbox registration request comprises: the mailbox name, mailbox password, the mailbox registration request indicating the registration of a first blockchain mailbox, and the first blockchain mailbox being consisting of the mailbox name and mailbox suffix.

In a preferred embodiment, the determining the mailbox name registration permission status based on a transaction record of the first blockchain address sent to the server blockchain address for verification and the verification balance within the verification time limit includes: querying the transaction record of the first blockchain address sent to the server blockchain address for verification within the verification time limit, if a transaction amount in the transaction record is equal to the verification balance, the mailbox name registration permission status is marked to be have been permitted.

In a preferred embodiment, the determining the mailbox name registration permission status based on a transaction record of the first blockchain address sent to the server blockchain address for verification and the verification balance within the verification time limit comprises: receiving mailbox name registration permission response and determining mailbox name registration permission status, the mailbox name registration permission response including mailbox name registration permission status, and the mailbox name registration permission status including the server querying the transaction record of the first blockchain address sent to the server blockchain address for verification within the verification time limit, in a condition that If the transaction amount in the transaction record is equal to the verification balance, the mailbox name registration permission status is marked as to be have been permitted.

In a preferred embodiment, the verification balance includes: the verification balance is greater than the minimum payment amount of the blockchain; and/or, the verification balance is less than a blockchain payment handling fee.

In a preferred embodiment, the mailbox name verification response further includes a validator code, the mailbox registration request further includes a validator verification code generated based on the validator code.

In a preferred embodiment, the method for blockchain mailbox registration for a registration device, further includes the following steps: sending a mailbox password reset request, wherein the mailbox password reset includes the mailbox name; receiving mailbox password reset response including server resetting blockchain address, and resetting verification balance; determining the mailbox password reset status based on the transaction record of the first blockchain address sent to the server resetting blockchain address to reset the blockchain address and the reset verification balance within the verification time limit; and sending a mailbox reset request based on the status of the mailbox reset password including the mailbox name and a new mailbox password.

In a second aspect, a method for blockchain mailbox registration for sever device, includes the following steps: receiving a mailbox name verification request comprising a mailbox name determined based on a first blockchain address, the mailbox name being one-to-one mapping with the first blockchain address; generating a verification balance and sending a mailbox name verification response comprising a server blockchain address for verification and the verification balance; determining the mailbox name registration permission status based on a transaction record of the first blockchain address sent to the server blockchain address for verification and the verification balance within the verification time limit; and receiving a mailbox registration request, wherein the mailbox registration request comprises: the mailbox name, mailbox password, the mailbox registration request indicating the registration of a first blockchain mailbox, and the first blockchain mailbox being composed of the mailbox name and mailbox suffix; and if the mailbox name registration permission status is permitted, register the first blockchain mailbox and the mailbox password according to the mailbox registration request.

In a preferred embodiment, the determining the mailbox name registration permission status based on a transaction record of the first blockchain address sent to the server blockchain address for verification and the verification balance within the verification time limit includes: querying the transaction record of the first blockchain address sent to the server blockchain address for verification within the verification time limit, if a transaction amount in the transaction record is equal to the verification balance, the mailbox name registration permission status is marked as to be have been permitted.

In a preferred embodiment, the method for blockchain mailbox registration for sever device, further includes sending a mailbox name registration permission response including: a mailbox name registration permission status.

In a preferred embodiment, the verification balance includes: the verification balance is greater than the minimum payment amount of the blockchain; and/or, the verification balance is less than a blockchain payment handling fee.

In a preferred embodiment, the mailbox name verification response further includes a validator code, the mailbox registration request further includes a validator verification code generated based on the validator code.

In a preferred embodiment, the method for blockchain mailbox registration for sever device, further includes: receiving a mailbox password reset request, wherein the mailbox password reset includes the mailbox name; sending mailbox password reset response including server resetting blockchain address, and resetting verification balance; determining the mailbox password reset status based on the transaction record of the first blockchain address sent to the server resetting blockchain address to reset the blockchain address and the reset verification balance within the verification time limit; and receiving a mailbox reset request based on the status of the mailbox reset password including the mailbox name and a new mailbox password.

In a third aspect, a method for blockchain mailbox payment for payment device, includes the following steps: displaying payment Quick Response (QR) code information to receive deductions, the payment QR code information including payment server address for payment, identification code, the identification code being assigned by the mailbox server to identify the first blockchain mailbox after a successful login of the first blockchain mailbox, the first blockchain mailbox being consisting of a mailbox name and a mailbox suffix; determining the mailbox name based on the first blockchain address one-to-one mapping with the mailbox name, and determining the mailbox name registration permission status being permitted based on a transaction record of the first blockchain address sent to the server blockchain address for verification and the verification balance within the verification time limit; receiving a payment request sent by the payment server, the payment request including payment receiving blockchain address, and payment amount; and If the payment amount is within a predetermined payment limit range, send the payment amount from the first blockchain address to the payment receiving blockchain address.

In a fourth aspect, a blockchain mailbox registration device includes a mailbox communication unit, and a verification unit, the mailbox communication unit and the verification unit being logically connected to each other. Wherein the mailbox communication unit is configured for: sending a mailbox name verification request including a mailbox name determined based on the first blockchain address, the mailbox name corresponding to the first blockchain address in a one-to-one mapping relationship; receiving mailbox name verification response including server blockchain address for verification and balance verification; and sending a mailbox registration request indicating the registration of a first blockchain mailbox, including the mailbox name and password, wherein the first blockchain mailbox is consisting of the mailbox name and mailbox suffix. The verification unit is configured for determining the mailbox name registration permission status based on the transaction record and verification balance sent from the first blockchain address to the server within the verification time limit.

In a fifth aspect, a server device includes a mailbox communication unit, a verification unit, and a registration unit; and the mailbox communication unit is logically connected to the verification unit and the registration unit. Wherein the mailbox communication unit is configured for: receiving a mailbox name verification request including a mailbox name determined based on the first blockchain address, the mailbox name corresponding to the first blockchain address in a one-to-one mapping relationship; generating a verification balance and sending a mailbox name verification response that include server blockchain addresses for verification and balance verification; and receiving a mailbox registration request indicating the registration of a first blockchain mailbox, including the mailbox name and password, wherein the first blockchain mailbox is consisting of the mailbox name and mailbox suffix. The verification unit is configured for determining the mailbox name registration permission status based on the transaction record and verification balance sent from the first blockchain address to the server within the verification time limit. The registration unit is configured for registering the first blockchain mailbox and the mailbox password according to the mailbox registration request if the mailbox name registration permission status is permitted.

In a sixth aspect, a blockchain mailbox payment device, includes a display unit, a payment communication unit, and a payment unit, the display unit is logically connected to the communication unit and the payment unit. Wherein the display unit is configured for displaying payment QR code information to receive deductions, the payment QR code information including payment server address for payment, identification code, the identification code being assigned by the mailbox server to identify the first blockchain mailbox after successful login of the first blockchain mailbox, the first blockchain mailbox is registered on the mailbox server according to the above method for registering a blockchain mailbox. The payment communication unit is configured for receiving a payment request sent by the payment server, the payment request including a payment receiving blockchain address and a payment amount. The payment unit is configured sending the payment amount from the first blockchain address to the payment receiving blockchain address if the payment amount is within the predetermined payment limit range.

In a seventh aspect, a non-transitory computer-readable storage medium storing computer program, wherein the computer program implements a method for blockchain mailbox registration when the computer program is executed by a processor.

The method and system for registering blockchain mailbox addresses of present invention has the following beneficial effects:

The present invention determines the mailbox name based on the first blockchain address, and determines the registration permission status of the mailbox name based on the transaction records and verification balance sent to the server blockchain address for verification by the first blockchain address within the verification time limit. If the registration permission status of the mailbox name is permitted, the first blockchain mailbox is registered. Through the blockchain mailbox of the present invention, both parties involved in blockchain transactions can communicate and exchange directly through mailbox using the blockchain address at the time of the transaction. The present invention realizes the comprehensive integration of blockchain and traditional internet in mailbox, and will promote the rapid development of the integration of traditional internet and new internet.

In the present invention, verified blockchain mailbox is used as a passport and can be included in the QR code to accept payment deductions. Through the present invention, blockchain payment is empowered with the ability of blockchain mailbox QR codes, enabling it to be quickly upgraded and widely adopted by various payment systems and channels, and quickly integrated into daily life chains.

BRIEF DESCRIPTION OF THE DRAWINGS

The accompanying drawings are used to provide a further understanding of the present invention, and constitute a part of the description, and are used to explain the present invention together with the embodiments of the present invention, and do not constitute a limitation to the invention model. In the attached drawings.

DETAILED DESCRIPTION OF PREFERRED EMBODIMENTS

The following is a further explanation of the present invention in conjunction with the accompanying drawings and embodiments:

First Embodiment

Figure 1:
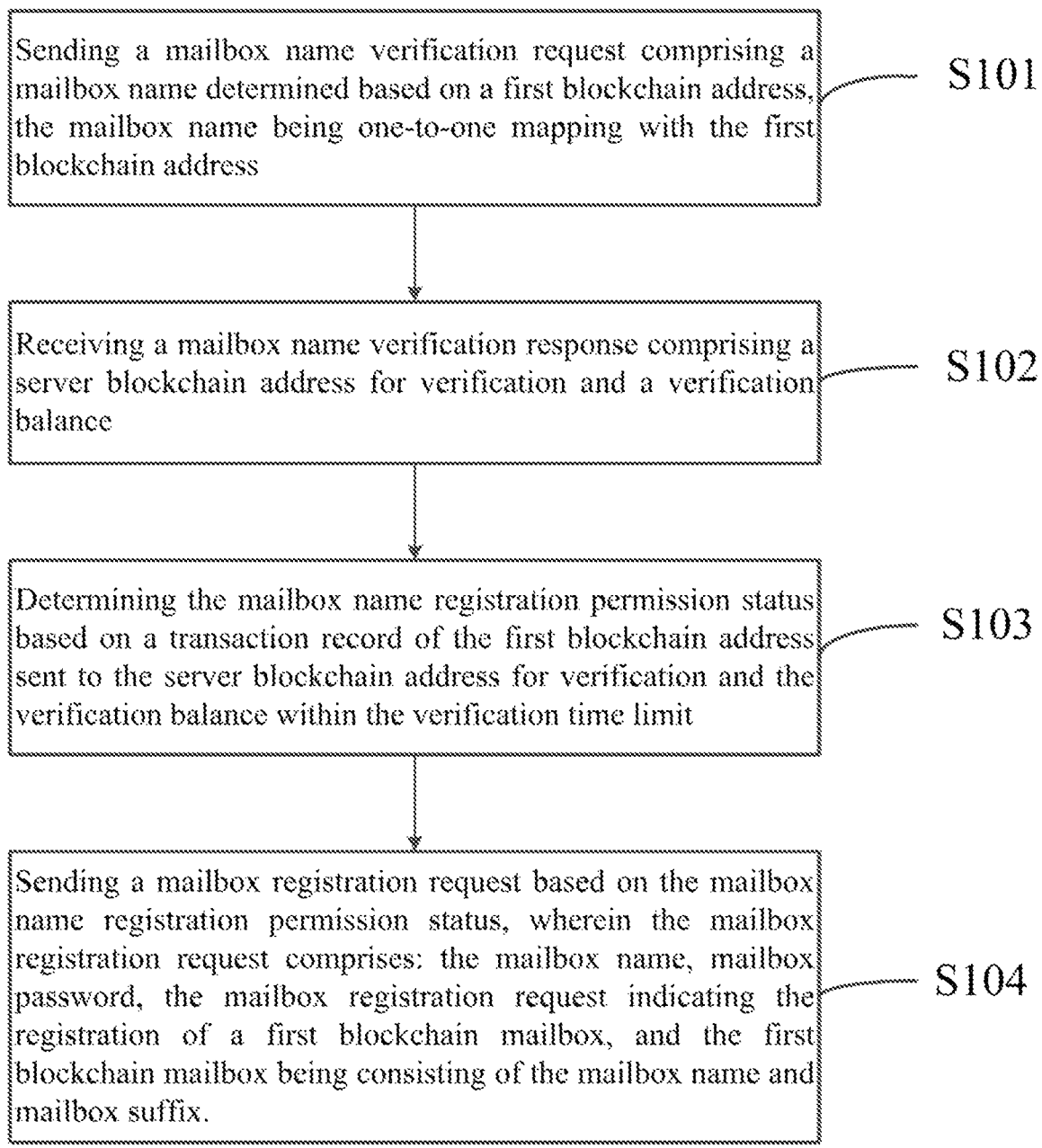
FIG. 1 is a method flowchart according to an embodiment of the present invention.

Example 1 of the present invention discloses a method for registering a blockchain mailbox, referring to FIG. 1, for a registration device, wherein the method includes:

Step S101, send a mailbox name verification request, which includes: a mailbox name determined based on the first blockchain address, and the mailbox name corresponds to the first blockchain address in a one-to-one mapping relationship. The blockchain in this embodiment includes block Directed Acyclic Graph (block-DAG) technology, etc.

The first blockchain address can correspond to a legal digital currency address, a blockchain asset address, a blockchain point address, etc.

Due to the different character rules supported by the mailbox system compared to blockchain addresses, it is necessary to transform the mailbox name based on the first blockchain address entered by the user to ensure that the transformed mailbox name meets the naming requirements of the existing mailbox system. For example, some mailbox systems do not support characters such as? * | \/< >. At the same time, users can also obtain the first blockchain address by transforming the mailbox name, and the mailbox name has a one-to-one mapping relationship or equivalent relationship with the first blockchain address. This transformation can be a regular expression or a reversible transformation of a function. The transformation can be done in the registration device or in the server device.

Step S102, receive a mailbox name verification response, which includes: server blockchain address for verification and verification of balance. After receiving the mailbox name verification request, the server device will select a suitable server to verify the blockchain address based on the first blockchain address or mailbox name, and send a randomly generated verification balance to the registration device for mailbox name verification response.

Step S103, determine the mailbox name registration permission status based on the transaction record and verification balance of the first blockchain address sent to the server for verification of the blockchain address within the verification time limit. There are two ways to determine the registration permission status of the mailbox name: by querying the registration device, and by querying the server device and sending it to the registration device. Regardless of the method, the server device will query blockchain transaction records.

Specifically, querying transaction records can include:
1. Registration device submission completion verification triggers verification;
2. monitoring blockchain transaction events;
3. Regularly query records based on preset time and step sizes.

Step S104, send a mailbox registration request based on the mailbox name registration permission status. The mailbox registration request includes: the mailbox name, and mailbox password, the mailbox registration request indicates the registration of a first blockchain mailbox, and the first blockchain mailbox is consisting of the mailbox name and mailbox suffix. A typical first blockchain mailbox would be a format of block_ffhhsgggdhjjjfiiiuyytrr@xxmail.com, wherein the mailbox the block_ffhhsgggdhjjjfiiiuyytrr is name, block: ffhhsgggdhjjjfiiiuyytrr is the first blockchain address, and xxmail.com is the mailbox suffix.

Furthermore, the transaction record of sending the first blockchain address to the server for verifying the blockchain address within the verification time limit and determining the mailbox name registration permission status based on the verification balance include: querying the transaction record of sending the first blockchain address to the server for verifying the blockchain address within the verification time limit, if the transaction amount in the transaction record is equal to the verification balance, the mailbox name registration permission status is marked to be have been permitted. In this embodiment, the registration device can independently complete preliminary verification of the mailbox name registration permission status for one-to-one mapping of blockchain addresses. By this embodiment, the pressure on the server device can be relatively light, but the networking of the registration device is slightly more complex.

Furthermore, the transaction record and verification balance of the first blockchain address sending to the server within the verification time limit to verify the blockchain address determine the mailbox name registration permission status, including:

Receive a response for mailbox name registration permission and determine the mailbox name registration permission status. The mailbox name registration permission response includes: mailbox name registration permission status, and the mailbox name registration permission status is: the transaction record sent from the first blockchain address to the server for verification of the blockchain address within the server query verification time limit. If the transaction amount in the transaction record is equal to the verification balance, the registration permission status of the mailbox name is marked to be have been permitted. Through this embodiment, the server device is under heavy pressure, but the registration device implementation is simple.

Furthermore, the verification balance includes: the verification balance is greater than the minimum payment amount of the blockchain; and/or, the verification balance is less than the blockchain payment handling fee.

Furthermore, the method further includes the mailbox name verification response including a validator code. The mailbox registration request further includes a validator verification code generated based on the validator code. There are various ways for validator code, usually generated by the server, such as: digital verification code, image verification code, 2FA two factor authentication, and so on. The registration device inputs the corresponding verification code according to the requirements of different methods. By using verification codes, it is possible to prevent others from preemptively registering blockchain mailboxes by monitoring to blockchain events.

Furthermore, the method further includes:
Send a mailbox password reset request, wherein the mailbox password reset includes: the mailbox name;
Receive a mailbox password reset response, which includes: server resetting blockchain address, resetting verification balance;
Determine the mailbox reset password status based on the transaction record of the first blockchain address sent to the server to reset the blockchain address within the verification time limit and the reset verification balance. The verification method at this time is the same as the verification method at registration.
Send a mailbox reset request based on the status of the mailbox reset password, which includes: the mailbox name and a new mailbox password.

This embodiment can reset the blockchain mailbox password by transferring the reset verification balance from the blockchain address to the server reset blockchain address.

In blockchain mailbox, if it is necessary to add a mailbox alias, the alias should use a different blockchain address, and the verification steps are the same as the registration method.

In this embodiment, the mailbox name and the first blockchain address have a one-to-one mapping correspondence, and the mailbox contains the first blockchain address information. There is no need to set up a separate binding or generate a mailbox blockchain address. The mailbox address is mapped to the mailbox name one by one through the blockchain address, and the verification balance is transferred to the server blockchain address to complete blockchain address verification, thereby registering a blockchain mailbox. The blockchain mailbox can prove the identity of the holder of the blockchain address and seamlessly integrate the blockchain with the mailbox system. The holder identity KYC can be verified according to regulations during mailbox registration or on the exchange where payment transactions are made.

Second Embodiment

Figure 2:
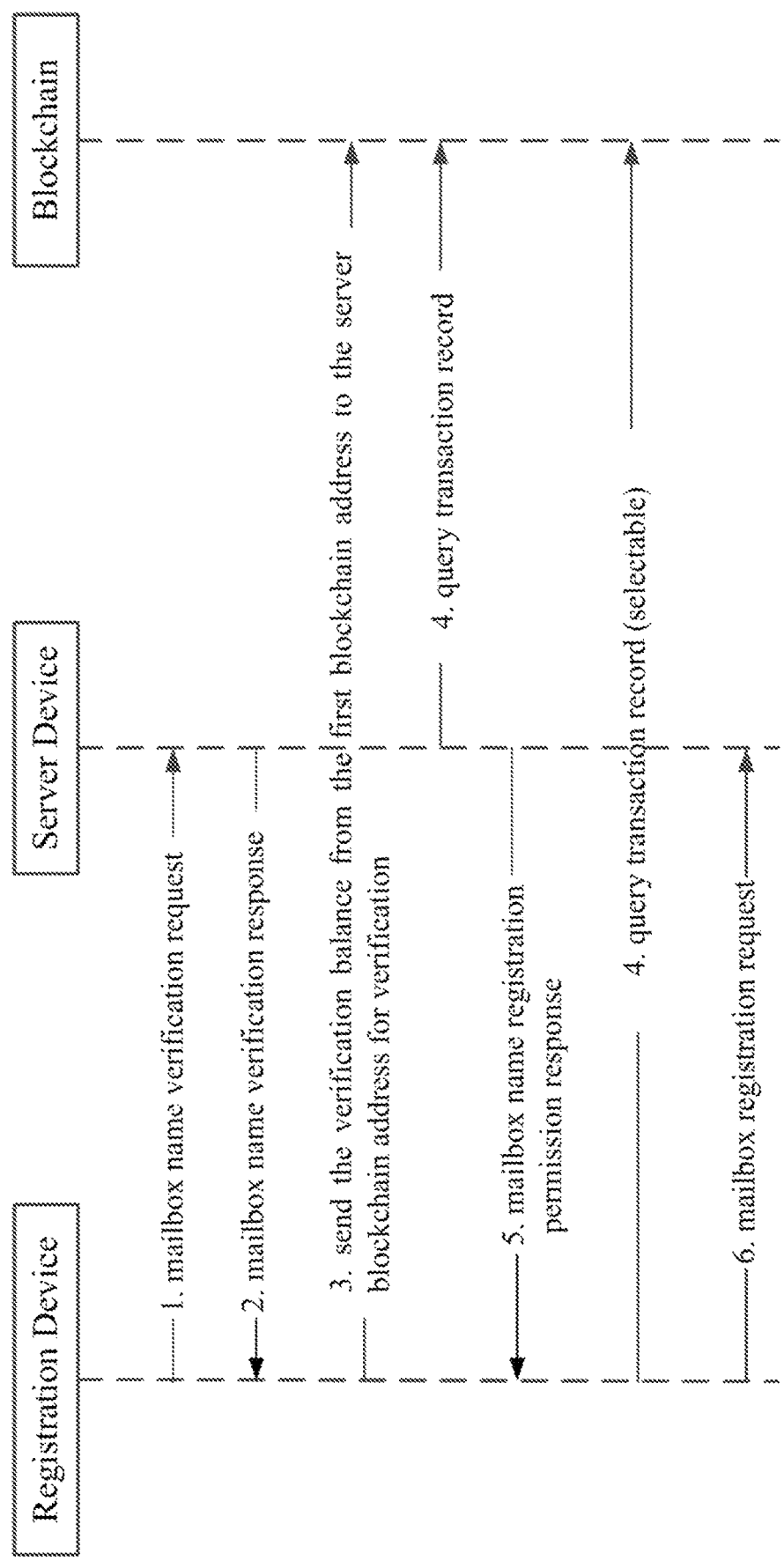
FIG. 2 shows a message flowchart according to an embodiment of the present invention.

The second embodiment discloses a method for registering a blockchain mailbox, referring to FIG. 2, for a server device, wherein the method includes:

Step S201, receive a mailbox name verification request, which includes: a mailbox name determined based on a first blockchain address, and the mailbox name corresponds to the first blockchain address in a one-to-one mapping relationship. The blockchain in this embodiment includes block-DAG technology, etc., and the first blockchain address can correspond to a legal digital currency address, a blockchain asset address, a blockchain point address, etc.

Step S202, generate a verification balance and send a mailbox name verification response, which includes a server verification the blockchain address and a verification balance. After receiving the mailbox name verification request, the server device will select a suitable server to verify the blockchain address based on the first blockchain address or mailbox name, and send a randomly generated verification balance to the registration device for mailbox name verification response.

Step S203, determine the mailbox name registration permission status based on the transaction record and verification balance of the first blockchain address sent to the server verification of the blockchain address within the verification time limit. There are two ways to determine the registration permission status of the mailbox name: by querying the registration device, and by querying the server device and sending it to the registration device. Regardless of the method, the server device will query blockchain transaction records.

Specifically, querying transaction records can include:
1. Registration device submission completion verification triggers verification;
2. monitoring blockchain transaction events;
3. Regularly query records based on preset time and step sizes.

Step S204, receive a mailbox registration request based on the mailbox name registration permission status. The mailbox registration request includes: the mailbox name, and mailbox password, the mailbox registration request indicates the registration of a first blockchain mailbox, and the first blockchain mailbox is consisting of the mailbox name and mailbox suffix. A typical first blockchain mailbox would be a format of block_ffhhsgggdhjjjfiiiuyytrr@xxmail.com, wherein the block_ffhhsgggdhjjjfiiiuyytrr is mailbox name, block: ffhhsgggdhjjjfiiiuyytrr is the first blockchain address, and xxmail.com is the mailbox suffix.

Step S205, if the mailbox name registration permission status is permitted, register the first blockchain mailbox and the mailbox password according to the mailbox registration request. After registering in the server device, you can use regular mailbox clients such as FoxMail to send and receive mailbox from block_ffhhsgggdhjjjfiiiuyytrr@xxmail.com.

Furthermore, the determination of the mailbox name registration permission status based on the transaction records sent from the first blockchain address to the server for verifying the blockchain address and the verification balance within the verification time limit includes querying the transaction records sent from the first blockchain address to the server for verifying the blockchain address within the verification time limit. If the transaction amount in the transaction records is equal to the verification balance, the mailbox name registration permission status is marked to be have been permitted.

Furthermore, the method further includes:

Send a mailbox name registration permission response, which includes: mailbox name registration permission status.

Furthermore, the verification balance comprises: the verification balance is greater than the minimum payment amount of the blockchain; and/or, the verification balance is less than the blockchain payment handling fee.

Furthermore, the method further includes the mailbox name verification response including a validator code. The mailbox registration request further includes a validator verification code generated based on the validator code. There are various ways for validator code, usually generated by the server, such as: digital verification code, image verification code, 2FA two factor authentication, and so on. The registration device inputs the corresponding verification code according to the requirements of different methods. By using verification codes, it is possible to prevent others from preemptively registering blockchain mailboxes by monitoring to blockchain events.

Furthermore, the method further includes:

Receive mailbox password reset request, wherein the mailbox password reset includes: the mailbox name;

Send a mailbox password reset response, which includes: server resetting blockchain address, resetting verification balance;

Determine the mailbox reset password status based on the transaction record of the first blockchain address sent to the server to reset the blockchain address and the reset verification balance within the verification time limit. The verification method at this time is the same as the verification method at registration.

Receive a mailbox reset request, which includes: the mailbox name and a new mailbox password.

This embodiment effectively separates information flow and fund flow, constructs a hybrid network of upper level mailbox application centralization network and lower level blockchain distributed network, and achieves comprehensive integration of blockchain and internet applications.

Third Embodiment

Third embodiment of the present invention discloses a method for blockchain mailbox payment, includes:

Step S301, display payment Quick Response (OR) code information for receiving deductions. The payment QR code information includes: payment server address for payment and identification code. The identification code is assigned by the mailbox server to identify the first blockchain mailbox after successful login of the first blockchain mailbox.

The first blockchain mailbox is consisting of a mailbox name and a mailbox suffix, and the mailbox name is determined based on the first blockchain address. The first blockchain address and the mailbox name have a one-to-one mapping correspondence. Based on the transaction records and verification balance sent by the first blockchain address to the server within the verification time limit, the registration permission status of the mailbox name is determined to be permitted.

Step S302, receive a payment request sent by the payment server, wherein the payment request includes: a payment receiving blockchain address and a payment amount;

Step S303, if the payment amount is within the predetermined payment limit range, send the payment amount from the first blockchain address to the payment receiving blockchain address. Payment devices such as wallets can be set as automatic small deduction payments, or they can display the need for users to click to confirm payment and other methods to complete sending payments.

This embodiment is an application of the blockchain mailbox of the present invention.

Using this embodiment, the payee can find the payer through a verified blockchain mailbox instead of a blockchain address. Among existing technologies, registering passports and other passes through mailbox and their applications are a mature technical solution, so blockchain mailbox can be easily integrated into various existing systems. More importantly, payment deduction can be completed on the terminal device (payment device), which is impossible in existing systems such as bank, Alipay payment and WeChat payment. At the same time, adopting a centralized blockchain mailbox system can facilitate convenient supervision in some regions. Blockchain mailbox payment has become a payment method that forms a controllable payment boundary, creating a win-win situation for regulation, consumers, and merchants, therefore, it can accelerate the formation of a blockchain technology innovation and application ecosystem.

Forth Embodiment

The forth embodiment of the present invention discloses a blockchain mailbox registration device, which includes a mailbox communication unit and a verification unit. The mailbox communication unit and the verification unit are logically connected to each other;

The Mailbox Communication Unit is Configured for:

Sending a mailbox name verification request including a mailbox name determined based on the first blockchain address, wherein the mailbox name corresponds to the first blockchain address in a one-to-one mapping relationship;

Receiving mailbox name verification responses that include server verification of blockchain addresses and balance verification; and Sending a mailbox registration request indicating the registration of a first blockchain mailbox, including the mailbox name and password, wherein the first blockchain mailbox is consisting of the mailbox name and mailbox suffix.

The verification unit is used to determine the mailbox name registration permission status based on the transaction records and verification balance sent from the first blockchain address to the server for verifying the blockchain address within the verification time limit.

Fifth Embodiment

The fifth embodiment of the present invention discloses a server device, which includes a mailbox communication unit, a verification unit, and a registration unit. The mailbox communication unit is logically connected to the verification unit and the registration unit;

The Mailbox Communication Unit is Configured for:

Receiving mailbox name verification requests including mailbox names determined based on the first blockchain address, and the mailbox names have a one-to-one mapping correspondence with the first blockchain address;

Generating a verification balance and sending a verification response including a server verification blockchain address and a mailbox name verification response for the verification balance; and Receiving a mailbox registration request indicating the registration of a first blockchain mailbox, including the mailbox name and password, wherein the first blockchain mailbox is consisting of the mailbox name and mailbox suffix.

The verification unit is used to determine the mailbox name registration permission status based on the transaction records and verification balance sent from the first blockchain address to the server for verifying the blockchain address within the verification time limit.

The registration unit is used to determine if the mailbox name registration permission status is permitted, and to register the first blockchain mailbox and the mailbox password according to the mailbox registration request.

The server device can include multiple mailbox server groups to provide mailbox services to the outside world through domain names.

Figure 3:
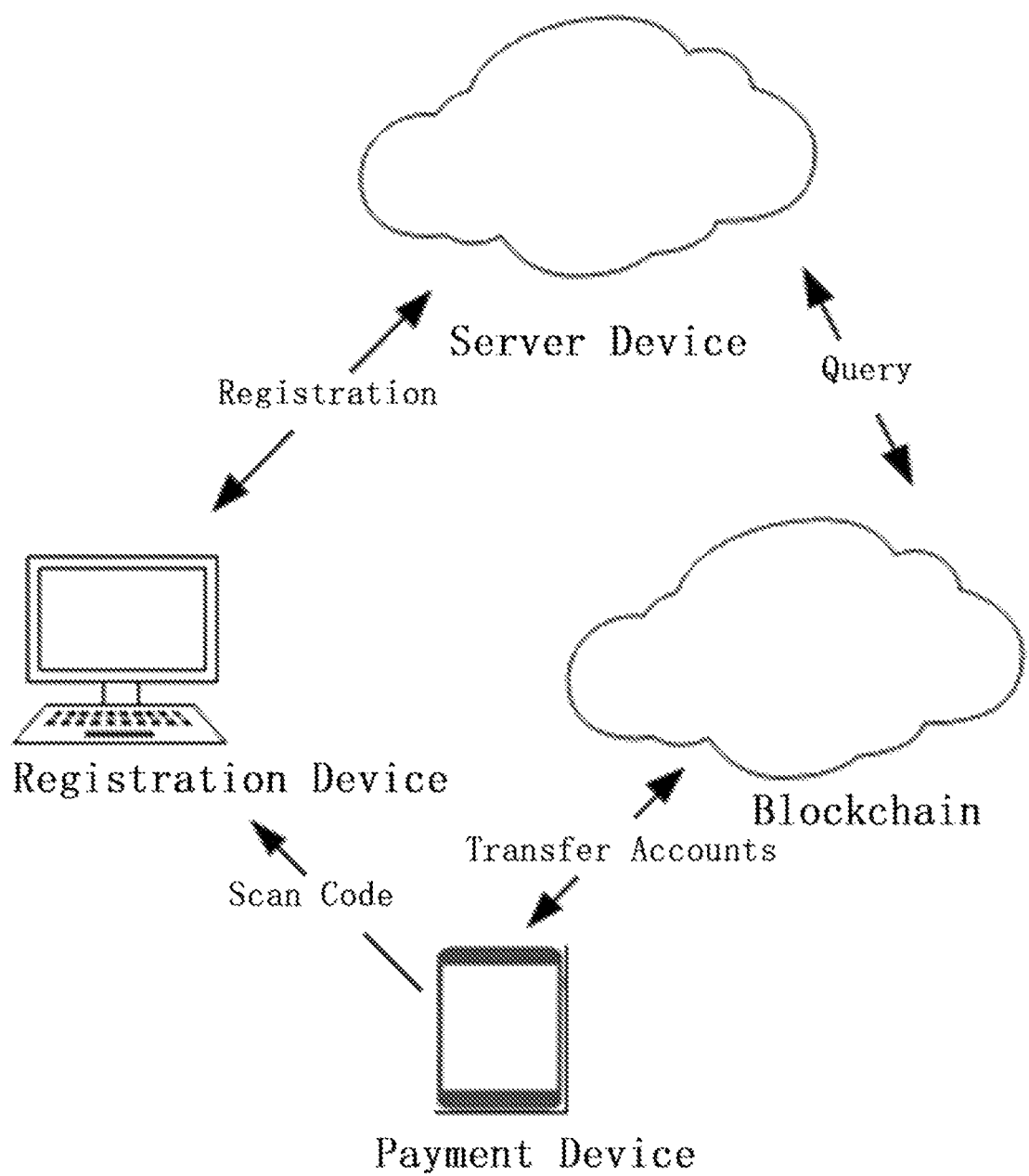
FIG. 3 a schematic view of a system according to an embodiment of the present invention.

In some typical scenarios, referring to FIGS. 2 and 3, the blockchain mailbox system includes: registration device, payment device, server device, and blockchain. The typical implementation methods are as follows:
1. The registration device sends a mailbox name verification request to the server device;
2. The server device returns a mailbox name verification response;
3. The registration device or payment device sends the verification balance from the first blockchain address to the server verification blockchain address;
4. The server device queries transaction records to determine that the mailbox name registration permission status is permitted;
5. The server device returns a mailbox name registration permission response;
6. The registration device requests the server device to register the mailbox, and the server device completes the registration of the blockchain mailbox;
7. The payment device receives and deducts payments based on the QR code displayed on the blockchain mailbox;
8. The payment device sends payment according to the instructions of the payment server;

Six Embodiment

The six embodiment of the present invention discloses a blockchain mailbox payment device, which includes a display unit, a payment communication unit, and a payment unit. The display unit is logically connected to the communication unit and the payment unit The display unit is used to display payment QR code information for receiving deductions. The payment QR code information includes: payment server address for payment and identification code. The identification code is allocated by the mailbox server to identify the first blockchain mailbox after the first blockchain mailbox is successfully logged in. The first blockchain mailbox is registered in the mailbox server according to any of the above blockchain mailbox registration methods;

The payment communication unit is used to receive payment requests sent by the payment server, which includes: a receiving blockchain address and a payment amount.

The payment unit is used to send the payment amount from the first blockchain address to the receiving blockchain address if the payment amount is within the predetermined payment limit range.

Figure 4:
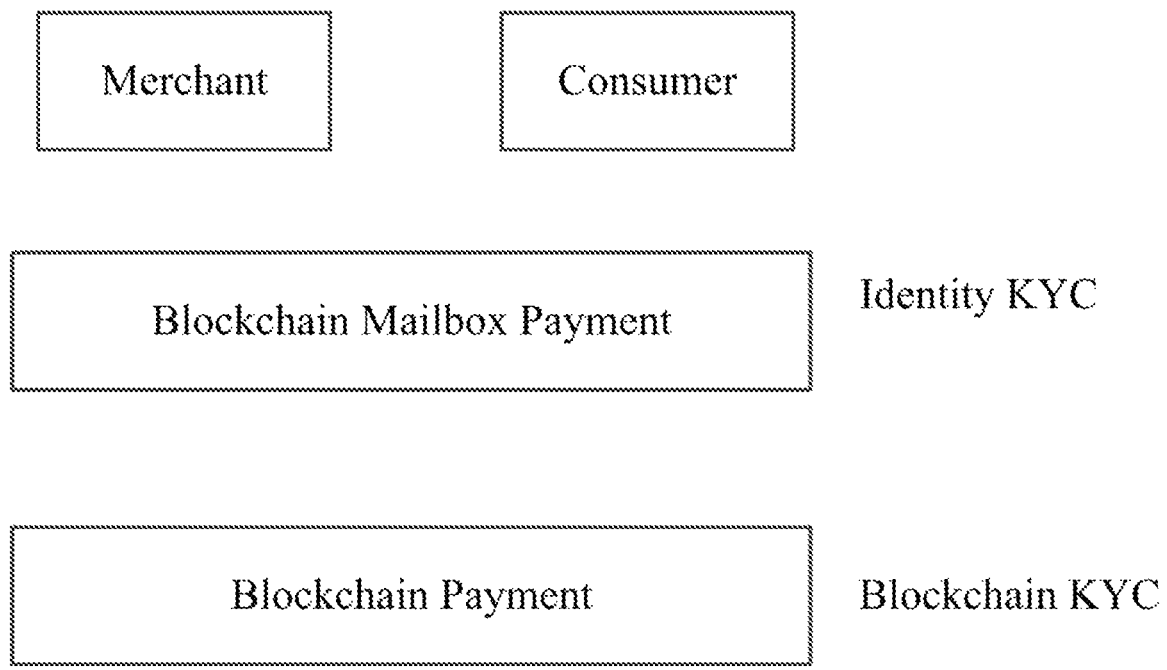
FIG. 4 is a schematic view of another system according to an embodiment of the present invention.

This embodiment invents a supervised transaction medium using blockchain mailbox as a payment method. Due to the low threshold for setting up blockchain mailboxes, diversified blockchain assets, and high degree of distribution of legal digital currencies, a diversified and regulated payment system can be formed through blockchain mailboxes, as shown in FIG. 4, the maximum change compared to existing centralized payment systems is that payment data is stored at the terminal.

Seventh Embodiment

The seventh embodiment of the present invention discloses a non-transitory computer-readable storage medium on which a computer program is stored. The feature is that when the computer program is executed by a processor, the steps of implementing any of the above blockchain mailbox registration methods or implementing any of the above blockchain mailbox payment methods are described. The storage medium may include high-speed random access storage medium, as well as non-volatile storage medium, such as hard disk, memory, plug-in hard disk, smart media card (SMC), secure digital (SD) card, flash card, at least one disk storage medium, flash device, or other volatile solid-state storage medium, etc.

In the present invention, the mailbox name is determined based on the first blockchain address, and the registration permission status of the mailbox name is determined based on the transaction records and verification balance sent from the first blockchain address to the server within the verification time limit. If the registration permission status of the mailbox name is permitted, the first blockchain mailbox is registered. Through the blockchain mailbox of the present invention, both parties in blockchain transactions can communicate and exchange directly through mailbox through the blockchain address at the time of the transaction. The present invention realizes the comprehensive integration of blockchain and traditional internet in mailbox, and will promote the rapid development of the integration of traditional internet and new internet.

In the present invention, a verified blockchain mailbox is used as a passport and can be included in a QR code to accept payment deductions. Through the present invention, blockchain payment is empowered with the ability of blockchain mailbox QR codes, enabling it to be quickly upgraded and widely adopted by various payment systems and channels, and quickly integrated into daily life chains.

Technicians in the field can clearly understand that, for the convenience and conciseness of description, the units described above are only illustrated by the division of each functional module mentioned above. In practical applications, the above functions can be assigned to different functional modules as needed, that is, the internal structure of the device can be divided into different functional modules to complete all or part of the functions described above. The specific working process of the system, device, and unit described above can refer to the corresponding process in the implementation examples of the aforementioned method, and will not be repeated here.

In the several embodiments provided in this application, it should be understood that the disclosed system, device, and method can be implemented in other ways. For example, the device embodiments described above are only illustrative. For example, the division of modules or units is only a logical function division, and there may be other division methods in actual implementation. For example, multiple units or components can be combined or integrated into another system, or some features can be ignored or not executed. Another point is that the coupling or direct coupling or communication connection displayed or discussed between each other can be indirect coupling or communication connection through some interfaces, devices or units, which can be in the form of electrical, mechanical or other forms.

The units described as separate components can be or may not be physically separated, and the components displayed as units can be or may not be physical units, that is, they can be located in one place or distributed across multiple network units. Some or all units can be selected according to actual needs to achieve the purpose of this embodiment.

In addition, in various embodiments of the present invention, each functional unit can be integrated into one processing unit, each unit can physically exist separately, or two or more units can be integrated into one unit. The integrated units mentioned above can be implemented in both hardware and software functional units.

If the integrated unit is implemented in the form of a software functional unit and sold or used as an independent product, it can be stored in a computer-readable storage medium. Based on this understanding, the technical solution of the present invention can essentially or in part, contribute to the existing technology, or all or part of the technical solution can be reflected in the form of a software product, which is stored in a storage medium, including several instructions to enable a computer device (which can be a personal computer, server, or network device, etc.) or processor to execute all or part of the steps of the methods described in various embodiments of the present invention.

The aforementioned storage media include: Universal Serial Bus (USB) flash drives, portable hard drives, read only memory (ROM), random access memory (RAM), disks or Compact Discs (CDs), and other medium that can store program code.

While embodiments of the present invention have been shown and described, it will be understood by those skilled in the art that various changes, modifications, substitutions and variations may be made to these embodiments without departing from the principles and spirit of the invention, the scope of which is defined by the appended claims and their equivalents.

What is claimed is:

1. A method for blockchain mailbox registration for a registration device, comprising:
    sending a mailbox name verification request comprising a mailbox name determined based on a first blockchain address, wherein the mailbox name has a one-to-one mapping relationship with the first blockchain address;
    receiving a mailbox name verification response comprising a server blockchain address for verification and a verification balance;
    determining a mailbox name registration permission status based on a transaction record of the first blockchain address sending to the server blockchain address within a verification time limit and the verification balance; and
    sending a mailbox registration request based on the mailbox name registration permission status, wherein the mailbox registration request comprises the mailbox name and a mailbox password, and the mailbox registration request indicates a registration of a first blockchain mailbox consisting of the mailbox name and a mailbox suffix.

2. The method for blockchain mailbox registration for the registration device according to claim 1, wherein the determining the mailbox name registration permission status based on the transaction record of the first blockchain address sending to the server blockchain address within the verification time limit and the verification balance comprises:
    querying the transaction record of the first blockchain address sent to the server blockchain address for verification within the verification time limit, determining a transaction amount in the transaction record is equal to the verification balance, and marking the mailbox name registration permission status as permitted.

3. The method for blockchain mailbox registration for the registration device according to claim 1, wherein
    the determining the mailbox name registration permission status based on the transaction record of the first blockchain address sending to the server blockchain address within the verification time limit and the verification balance comprises:
    receiving a mailbox name registration permission response and determining the mailbox name registration permission status, wherein the mailbox name registration permission response comprises the mailbox name registration permission status; and
    the mailbox name registration permission status is determined by: the server querying the transaction record of the first blockchain address sent to the server blockchain address for verification within the verification time limit, determining a transaction amount in the transaction record is equal to the verification balance, and marking the mailbox name registration permission status as permitted.

4. The method for blockchain mailbox registration for the registration device according to claim 1, wherein the verification balance is greater than a minimum payment amount of a blockchain; and/or, the verification balance is less than a blockchain payment handling fee.

5. The method for blockchain mailbox registration for the registration device according to claim 1, wherein the mailbox name verification response further comprises a validator code, and the mailbox registration request further comprises a validator verification code generated based on the validator code.

6. The method for blockchain mailbox registration for the registration device according to claim 1, further comprising:
    sending a mailbox password reset request, wherein the mailbox password reset request comprises the mailbox name;
    receiving a mailbox password reset response comprising a server resetting blockchain address, and a resetting verification balance;
    determining a mailbox password reset status based on the transaction record of the first blockchain address sending to the server resetting blockchain address within the verification time limit and the resetting verification balance within the verification time limit; and sending a mailbox reset request based on the mailbox password reset status, wherein the mailbox reset request comprises the mailbox name and a new mailbox password.

7. A non-transitory computer-readable storage medium storing a computer program, wherein the computer program implements the method for blockchain mailbox registration for the registration device of claim 1 when the computer program is executed by a processor.

8. A method for blockchain mailbox registration for a server device, comprising:
   receiving a mailbox name verification request comprising a mailbox name determined based on a first blockchain address, wherein the mailbox name has a one-to-one mapping relationship with the first blockchain address;
   generating a verification balance and sending a mailbox name verification response, wherein the mailbox name verification response comprises a server blockchain address for verification and the verification balance;
   determining a mailbox name registration permission status based on a transaction record of the first blockchain address sending to the server blockchain address within a verification time limit and the verification balance; and
   receiving a mailbox registration request, wherein the mailbox registration request comprises: the mailbox name, a mailbox password, and the mailbox registration request indicates a registration of a first blockchain mailbox consisting of the mailbox name and a mailbox suffix; and
   determining the mailbox name registration permission status is permitted; and registering the first blockchain mailbox and the mailbox password according to the mailbox registration request.

9. The method for blockchain mailbox registration for a server device according to claim 8, wherein the determining the mailbox name registration permission status based on the transaction record of the first blockchain address sending to the server blockchain address within the verification time limit and the verification balance comprises:
   querying the transaction record of the first blockchain address sent to the server blockchain address for verification within the verification time limit, determining a transaction amount in the transaction record is equal to the verification balance, and marking the mailbox name registration permission status as permitted.

10. The method for blockchain mailbox registration for a server device according to claim 9, further comprising:
    sending a mailbox name registration permission response comprising: a mailbox name registration permission status.

11. The method for blockchain mailbox registration for a server device according to claim 8, wherein the verification balance is greater than a minimum payment amount of a blockchain; and/or, the verification balance is less than a blockchain payment handling fee.

12. The method for blockchain mailbox registration for a server device according to claim 8, wherein the mailbox name verification response further comprises a validator code, and the mailbox registration request further comprises a validator verification code generated based on the validator code.

13. The method for blockchain mailbox registration for a server device according to claim 8, further comprising:
    receiving a mailbox password reset request, wherein the mailbox password reset request comprises the mailbox name;
    sending a mailbox password reset response comprising a server resetting blockchain address, and a resetting verification balance;
    determining a mailbox password reset status based on the transaction record of the first blockchain address sending to the server resetting blockchain address within the verification time limit and the resetting verification balance within the verification time limit; and
    receiving a mailbox reset request based on the mailbox password reset status, wherein the mailbox reset request comprises the mailbox name and a new mailbox password.

14. A method for blockchain mailbox payment for a payment device, comprising:
    obtaining an identification code assigned by a mailbox server to identify a first blockchain mailbox after a successful login to the first blockchain mailbox, wherein the first blockchain mailbox is registered on the mailbox server according to the method for blockchain mailbox registration for the registration device of claim 1, and consists of a mailbox name and a mailbox suffix;
    displaying payment Quick Response (QR) code information to receive a payment deduction, wherein the payment QR code information comprises a payment server address, and the identification code;
    verifying that a mailbox name registration permission status for the first blockchain mailbox is permitted, wherein the mailbox name registration permission status is verified based on a transaction record of a first blockchain address sending to a server blockchain address within a verification time limit and a verification balance, and wherein the mailbox name has a one-to-one mapping relationship with the first blockchain address;
    receiving a payment request sent by a payment server, wherein the payment request comprises a payment-receiving blockchain address, and a payment amount; and
    in response to successfully verifying that the mailbox name registration permission status is permitted and upon determining that the payment amount is within a predetermined payment limit range, sending the payment amount from the first blockchain address to a payment receiving blockchain address.

\* \* \* \* \*